US012650016B2

(12) United States Patent
Nedungadi et al.

(10) Patent No.:  US 12,650,016 B2
(45) Date of Patent:       Jun. 9, 2026

(54) METHODS FOR INSTALLING A MOUNTING BRACKET TO A T-BAR

(71) Applicant: Nile Global, Inc., San Jose, CA (US)

(72) Inventors: Promode Nedungadi, San Jose, CA (US); Vigneshwara Upadhyaya, Bangalore (IN)

(73) Assignee: NILE GLOBAL, INC., San Jose, CA (US)

( * ) Notice: Subject to any disclaimer, the term of this patent is extended or adjusted under 35 U.S.C. 154(b) by 154 days.

(21) Appl. No.: 18/677,716

(22) Filed: May 29, 2024

(65) Prior Publication Data

US 2025/0347109 A1      Nov. 13, 2025

Related U.S. Application Data

(60) Provisional application No. 63/643,568, filed on May 7, 2024.

(51) Int. Cl.
| | |
|---|---|
| *E04B 9/12* | (2006.01) |
| *E04B 9/00* | (2006.01) |
| *E04B 9/06* | (2006.01) |
| *F16M 13/02* | (2006.01) |
| *H04Q 1/02* | (2006.01) |

(52) U.S. Cl.
CPC .............. *E04B 9/127* (2013.01); *E04B 9/006* (2013.01); *E04B 9/067* (2013.01); *F16M 13/027* (2013.01); *H04Q 1/09* (2013.01)

(58) Field of Classification Search
CPC .......... E04B 9/127; E04B 9/006; E04B 9/067; F16M 13/027; H04Q 1/09
See application file for complete search history.

(56) References Cited

U.S. PATENT DOCUMENTS

| | | | | | |
|---|---|---|---|---|---|
| 3,003,735 | A | * | 10/1961 | Havener | ................ F16B 37/042 |
| | | | | | 248/228.7 |
| 3,018,080 | A | * | 1/1962 | Loudon | ................... E04B 9/006 |
| | | | | | 248/228.4 |
| 3,053,494 | A | * | 9/1962 | Stoll | ......................... F16L 3/24 |
| | | | | | 248/228.3 |

(Continued)

OTHER PUBLICATIONS

Cisco Systems, Inc., "Access Point Mounting Instructions", published Nov. 8, 2010, 16 pgs.

(Continued)

*Primary Examiner* — Patrick J Maestri
(74) *Attorney, Agent, or Firm* — LOZA & LOZA, LLP

(57) ABSTRACT
Examples of a method for installing a mounting bracket to a T-bar of a suspended ceiling are disclosed. A method involves engaging at least one flange hook of a bracket body of a mounting bracket with a first edge of a flange of a T-bar, applying force to a locking mechanism of a toolless locking element of the mounting bracket to free up a slidable piece of the toolless locking element, while the force is applied to the locking mechanism, moving the slidable piece towards a second edge of the flange of the T-bar until a flange hook of the slidable piece engages the second edge of the flange of the T-bar, and after the flange hook of the slidable piece engages the second edge of the flange of the T-bar, releasing the force on the locking mechanism so that the slidable piece is locked in place.

13 Claims, 13 Drawing Sheets

(56)        References Cited

U.S. PATENT DOCUMENTS

| 5,335,890 | A | * | 8/1994 | Pryor ..................... A47H 15/02 |
| | | | | 248/343 |
| 5,904,592 | A | | 5/1999 | Baran et al. |
| 6,563,697 | B1 | | 5/2003 | Simbeck et al. |
| 9,161,465 | B2 | | 10/2015 | Chen et al. |
| 9,303,811 | B1 | | 4/2016 | Lutz, Jr. et al. |
| 9,331,404 | B2 | | 5/2016 | Devanand et al. |
| 9,444,231 | B2 | | 9/2016 | Ho et al. |
| 10,161,565 | B2 | | 12/2018 | Wu |
| 10,774,985 | B1 | * | 9/2020 | Ortel .................... F16M 11/041 |
| 10,798,842 | B1 | | 10/2020 | Wen et al. |
| 11,326,735 | B1 | * | 5/2022 | Rosenthal .............. F16M 13/02 |
| 11,408,171 | B1 | | 8/2022 | Hallowell |
| 11,486,539 | B2 | | 11/2022 | Wu et al. |
| 11,619,086 | B2 | | 4/2023 | Wu |
| 11,632,865 | B1 | * | 4/2023 | Liang ................... F16M 11/041 |
| | | | | 248/221.11 |
| 11,647,107 | B2 | | 5/2023 | Chiang |
| 11,885,461 | B2 | | 1/2024 | Zlotnikov et al. |
| 2008/0146055 | A1 | | 6/2008 | Eckardt |
| 2022/0042645 | A1 | | 2/2022 | Wu et al. |
| 2022/0279672 | A1 | | 9/2022 | Huang |
| 2025/0126725 | A1 | | 4/2025 | Ramones et al. |

OTHER PUBLICATIONS

Non-Final Office Action on co-pending US application (U.S. Appl. No. 18/677,707) dated Feb. 20, 2026.

* cited by examiner

104

104

112

118

116

114

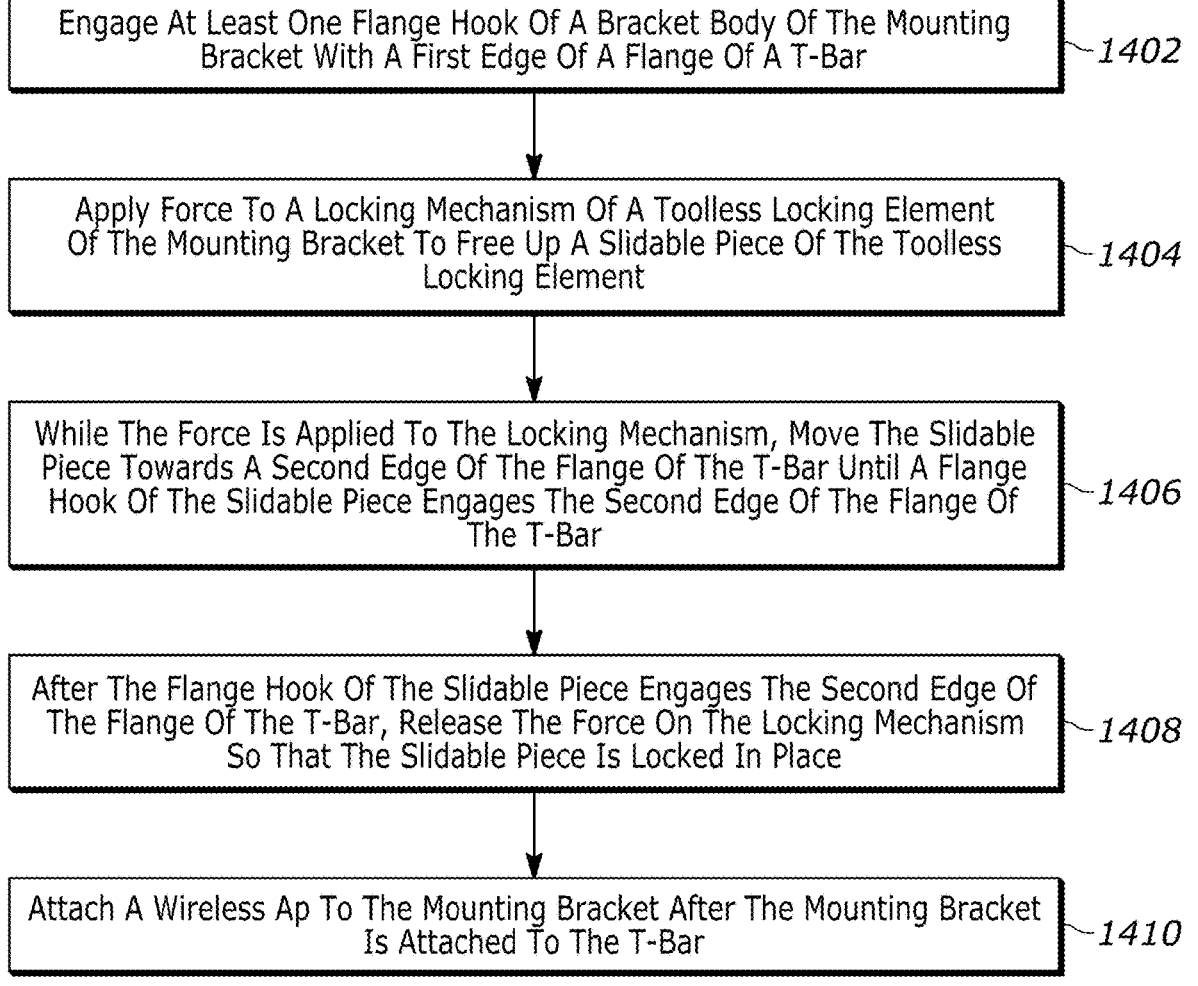

Engage At Least One Flange Hook Of A Bracket Body Of The Mounting Bracket With A First Edge Of A Flange Of A T-Bar ~1402

Apply Force To A Locking Mechanism Of A Toolless Locking Element Of The Mounting Bracket To Free Up A Slidable Piece Of The Toolless Locking Element ~1404

While The Force Is Applied To The Locking Mechanism, Move The Slidable Piece Towards A Second Edge Of The Flange Of The T-Bar Until A Flange Hook Of The Slidable Piece Engages The Second Edge Of The Flange Of The T-Bar ~1406

After The Flange Hook Of The Slidable Piece Engages The Second Edge Of The Flange Of The T-Bar, Release The Force On The Locking Mechanism So That The Slidable Piece Is Locked In Place ~1408

Attach A Wireless Ap To The Mounting Bracket After The Mounting Bracket Is Attached To The T-Bar ~1410

FIG. 14

METHODS FOR INSTALLING A MOUNTING BRACKET TO A T-BAR

CROSS-REFERENCE TO RELATED APPLICATION

This application claims priority to provisional U.S. Patent Application Ser. No. 63/643,568, filed May 7, 2024, which is incorporated by reference herein, and is related to co-pending U.S. Patent Application Ser. No. 18/677,707, filed May 29, 2024, entitled MOUNTING BRACKET FOR A T-BAR.

BACKGROUND

In may campus networks, wireless, or WiFi, access points (APs) are very common. These wireless APs can be installed in various different campus building of a campus and are frequency installed at the ceiling of the campus buildings. Many campus buildings use a "hanging" or "drop" ceiling that includes a grid of T-bars that hang down from hanging wires and upon which ceiling tiles sit. Often times, wireless APs are attached to the T-bars that support the ceiling tiles. Typically, the installation of a wireless AP to a T-bar of a drop ceiling takes at least one tool and significant effort by the installer, which can be cumbersome, and problematic when a proper tool is not available.

SUMMARY

Examples of an apparatus and method are disclosed. A method for installing a mounting bracket to a T-bar of a suspended ceiling is disclosed. The method involves engaging at least one flange hook of a bracket body of a mounting bracket with a first edge of a flange of a T-bar, applying force to a locking mechanism of a toolless locking element of the mounting bracket to free up a slidable piece of the toolless locking element, while the force is applied to the locking mechanism, moving the slidable piece towards a second edge of the flange of the T-bar until a flange hook of the slidable piece engages the second edge of the flange of the T-bar, and after the flange hook of the slidable piece engages the second edge of the flange of the T-bar, releasing the force on the locking mechanism so that the slidable piece is locked in place.

In an example, the force is applied perpendicular to a plane of the bracket body.

In an example, the toolless locking element includes a lock plunger that is configured to disengage with the slidable piece in response to an applied force.

In an example, the lock plunger is accessible from a bottom side of the bracket body.

In an example, the slidable piece has a tab at an end of the slidable piece that is opposite the flange hook of the slidable piece.

In an example, the bracket body includes at least two flange hooks configured to receive the first edge of the flange of the T-bar.

In an example, the flange hook of the slidable piece is between the at least two flange hooks of the bracket body.

A method for installing a wireless access point (AP) to a T-bar of a suspended ceiling is disclosed. The method involves engaging at least one flange hook of a bracket body of the mounting bracket with a first edge of a flange of a T-bar, applying force to a locking mechanism of a toolless locking element of the mounting bracket to free up a slidable piece of the toolless locking element, while the force is applied to the locking mechanism, moving the slidable piece towards a second edge of the flange of the T-bar until a flange hook of the slidable piece engages the second edge of the flange of the T-bar, after the flange hook of the slidable piece engages the second edge of the flange of the T-bar, releasing the force on the locking mechanism so that the slidable piece is locked in place, and attaching a wireless access point (AP) to the mounting bracket after the mounting bracket is attached to the T-bar.

In an example, The method of claim 8, wherein attaching the wireless AP to the mounting bracket involves aligning mounting pegs of the wireless AP with keyholes of the bracket body, passing the mounting pegs through the keyholes, and then moving the wireless AP horizontally relative to the bracket body to lock the mounting pegs in narrow portions of the keyholes.

In an example, The method of claim 8, wherein attaching the wireless AP to the mounting bracket involves aligning four mounting pegs of the wireless AP with four keyholes of the bracket body, passing the four mounting pegs through the four keyholes, and then moving the wireless AP horizontally relative to the bracket body to lock the four mounting pegs in narrow portions of the four keyholes.

In an example, the four keyholes are distributed at four corners of the bracket body.

In an example, the keyholes of the bracket body includes two circular shaped features.

In an example, the method further involves attaching a male connector of a cable assembly to a female connector of the wireless AP, seating a portion of the cable assembly into a cable holding channel of the bracket body, and connecting a male connector of a cable to a female connector of the cable assembly.

In an example, a mounting bracket for attaching to a T-bar of a suspended ceiling is disclosed. The mounting bracket includes a bracket body, the bracket body including, multiple keyholes, and at least one flange hook configured to receive a first edge of a flange of the T-bar, a toolless locking element including a slidable piece having a flange hook configured to receive a second edge of the flange of the T-bar, the second edge of the flange of the T-bar being opposite the first edge of the flange of the T-bar, and a locking mechanism that is configured to allow the slidable piece to move parallel to the bracket body when a force is applied to the locking mechanism.

In an example, the toolless locking element includes a lock plunger that is configured to disengage with the slidable piece in response to an applied force.

In an example, the lock plunger is accessible from a bottom side of the bracket body.

In an example, the lock plunger is accessible from a bottom side of the bracket body.

In an example, the slidable piece includes a tab that extends beyond a footprint of the bracket body.

In an example, the slidable piece has a tab at an end of the slidable piece that is opposite the flange hook of the slidable piece.

In an example, the bracket body includes at least two flange hooks configured to receive the first edge of the flange of the T-bar.

In an example, the flange hook of the slidable piece is between the at least two flange hooks of the bracket body.

In an example, the bracket body includes a cable holding channel.

In an example, the bracket body includes a cable holding channel that runs parallel to the slidable piece of the toolless locking mechanism.

In an example, the bracket body includes a cable holding channel that includes cable holding tabs.

In an example, the bracket body includes a cable holding channel that includes cable holding tabs on both sides of the cable holding channel.

In an example, the bracket body includes four keyholes.

In an example, the bracket body is rectangular shaped and includes four keyholes distributed at four corners of the bracket body.

In an example, the keyholes of the bracket body includes two circular shaped features.

An apparatus is disclosed. The apparatus includes a wireless access point (AP), and a mounting bracket attached to the wireless AP, the mounting bracket configured to attach to a T-bar of a suspended ceiling, the mounting bracket including a bracket body, the bracket body including, multiple keyholes, and at least one flange hook configured to receive a first edge of a flange of the T-bar, a toolless locking element including, a slidable piece having a flange hook configured to receive a second edge of the flange of the T-bar, the second edge of the flange of the T-bar being opposite the first edge of the flange of the T-bar, and a locking mechanism that is configured to allow the slidable piece to move parallel to the bracket body when a force is applied to the locking mechanism.

In an example, the wireless AP includes mounting pegs that are locked to corresponding ones of the multiple keyholes of the bracket body.

In an example, the bracket body is rectangular shaped and includes four keyholes distributed at four corners of the bracket body, and wherein the wireless AP includes mounting pegs that are locked to corresponding ones of the four keyholes of the bracket body.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 14 is a process flow diagram of a method for installing a wireless AP to a T-bar of a suspended ceiling.

Throughout the description, similar reference numbers may be used to identify similar elements.

DETAILED DESCRIPTION

Figure 1:
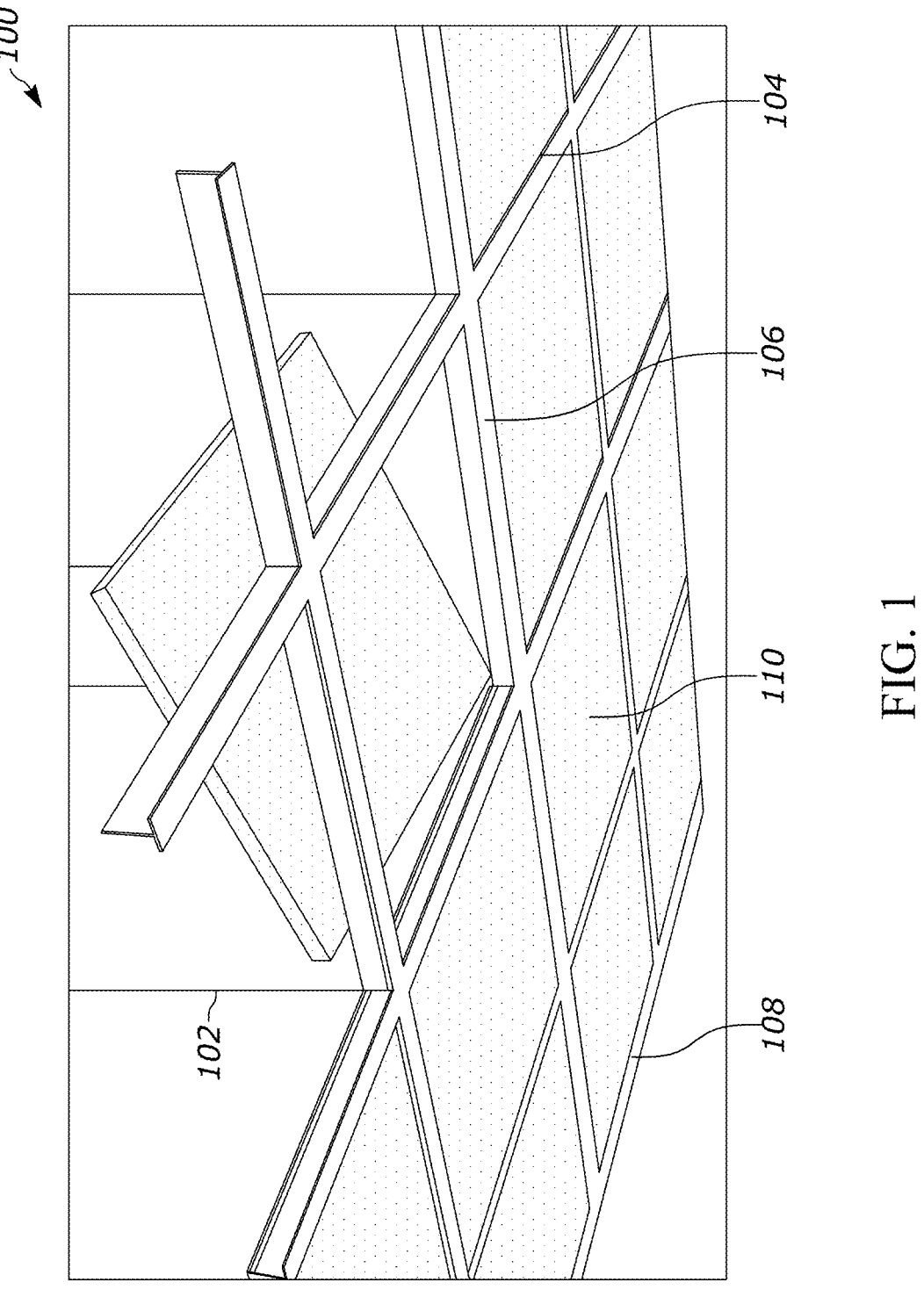
FIG. 1 is a perspective view of a suspended, or drop, ceiling.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Installation of a wireless AP to a T-bar of a drop ceiling typically requires at least one tool and involves significant effort by the installer, which can be cumbersome, and problematic when a proper tool is not available. Additionally, the installation of a wireless AP may involve cutting a hole or channel in a ceiling tile to allow a network cable to connect to the wireless AP.

In order to enable a toolless installation of a wireless AP to a T-bar of a drop ceiling, a novel mounting bracket is disclosed. In an example, a mounting bracket includes a bracket body, the bracket body including multiple keyholes and at least one flange hook configured to receive a first edge of a flange of the T-bar, a toolless locking element that includes a slidable piece having a flange hook configured to receive a second edge of the flange of the T-bar, the second edge of the flange of the T-bar being opposite the first edge of the flange of the T-bar, and a locking mechanism that is configured to allow the slidable piece to move parallel to the bracket body when a force is applied to the locking mechanism, for example, in a direction that is perpendicular to the bracket body. In an example, the locking mechanism is designed to allow the slidable piece to move parallel to the bracket body with a force that can easily be applied to the locking mechanism by a finger of a person. For example, the locking mechanism includes a lock plunger that has an activation surface upon which force can be applied by a finger. Thus, the mounting bracket can be attached to the flange of a T-bar of, for example, a drop ceiling without the need for any tools.

Once the mounting bracket is attached to the flange of the T-bar, a wireless AP can be attached to the mounting bracket without the need for any tools. In an example, mounting pegs on the wireless AP are aligned with the keyholes of the mounting bracket and the wireless AP is brought into close proximity to the mounting bracket. The wireless AP is moved relative to the mounting bracket such that the mounting pegs of the wireless AP engage with the mounting bracket to securely attach the wireless AP to the mounting bracket. Using such a mounting bracket, a wireless AP can be installed at the ceiling of a building easily, quickly, and without the need for any tools.

FIG. 1 is a perspective view of a suspended, or drop, ceiling 100. The drop ceiling includes hanger wires 102, main T-bars 104, cross T-bars 106, edge molding 108, and ceiling tiles 110. Such drop ceilings are common in enterprise campus buildings and wireless APs are often connected to the T-bars, including the main and cross T-bars.

Figure 2A:
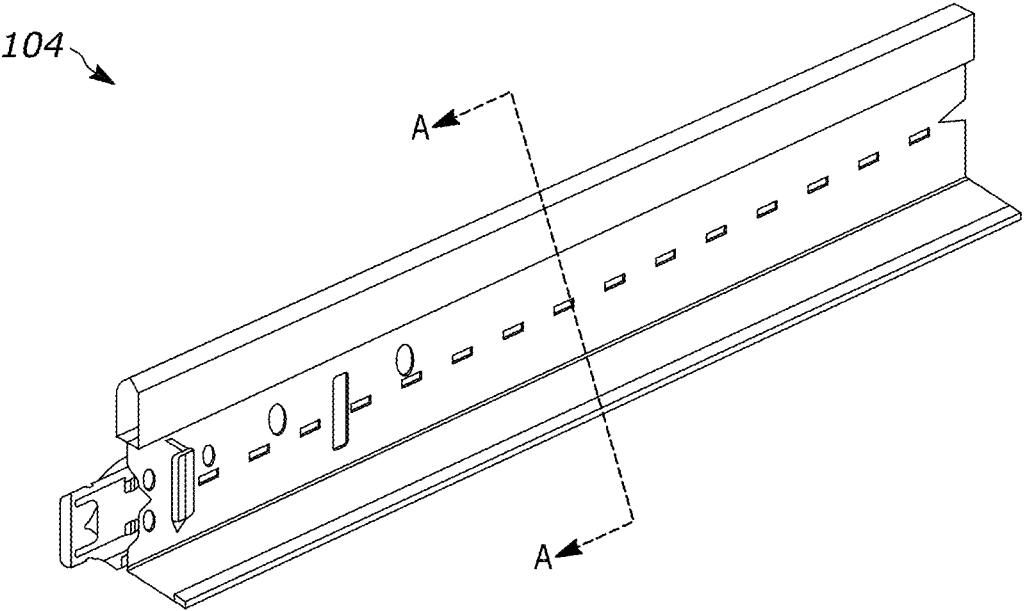
FIG. 2A is a perspective view of an example of a section of T-bar.
Figure 2B:
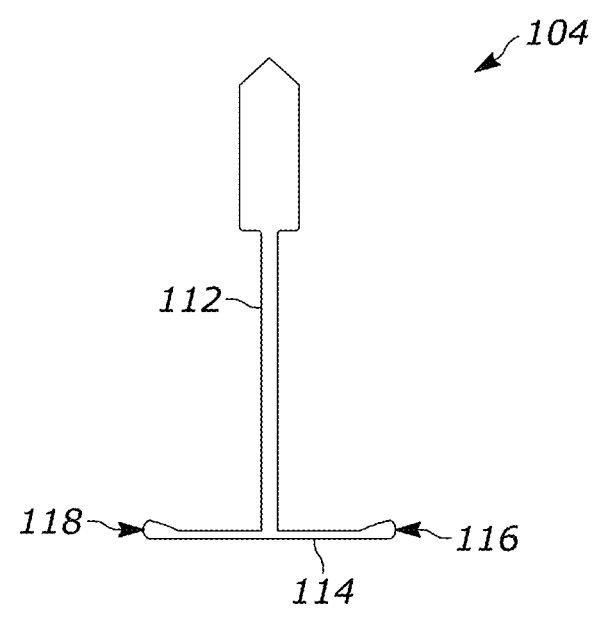
FIG. 2B is a cross-section view of the T-bar shown in FIG. 2A and cross-section AA.

FIG. 2A is a perspective view of an example of a section of T-bar 104 and FIG. 2B is a cross-section view of the T-bar 104 shown in FIG. 2A at cross-section AA. With reference to FIG. 2B, the T-bar includes a web 112 and a flange 114. The flange includes edges that are opposite to each other, e.g., a first edge 116 of the flange and a second edge 118 of the flange. In an example, the web is 43 mm in height and the flange is 24 mm in width although these are only example dimensions.

Figure 3:
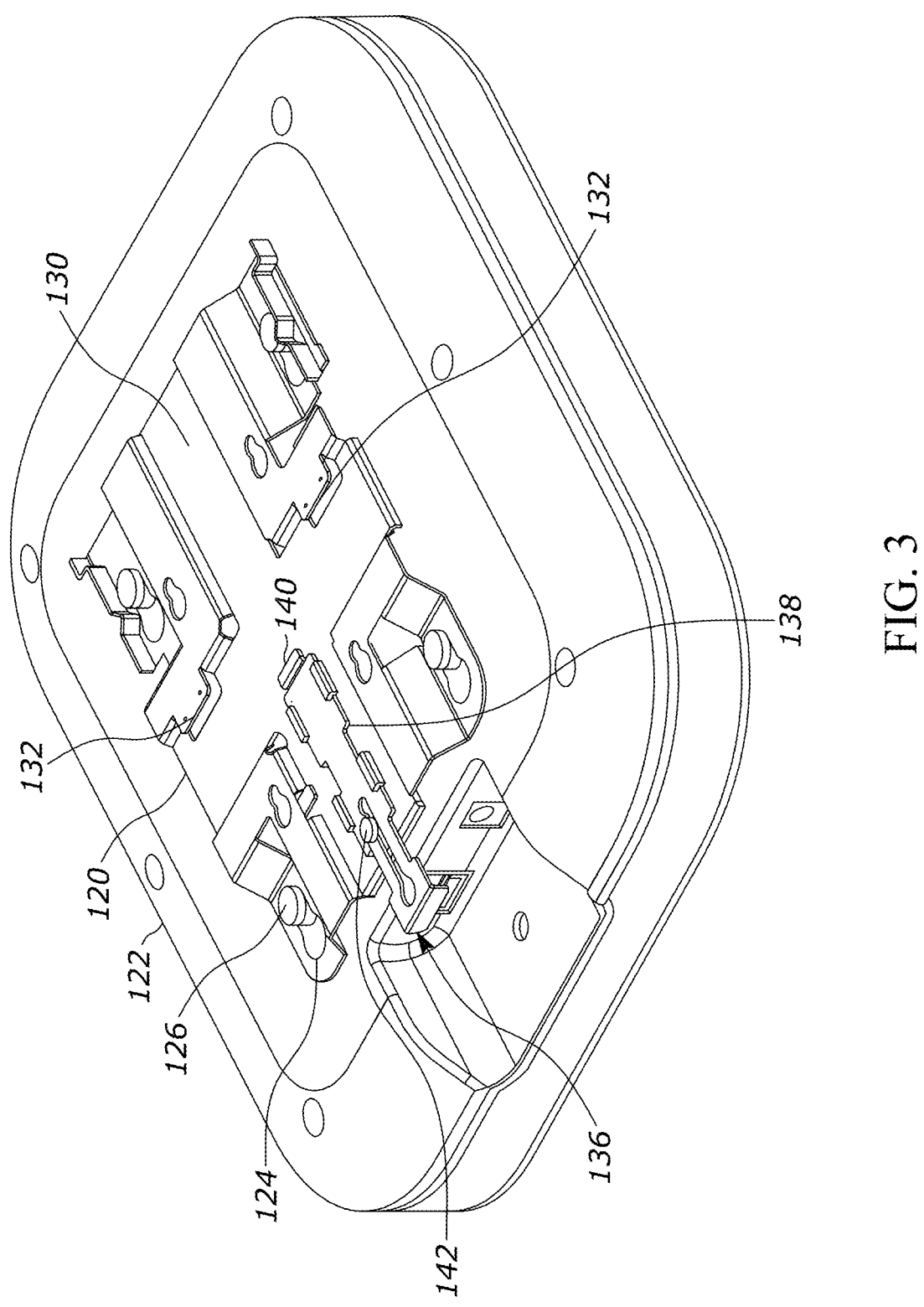
FIG. 3 is a perspective view of a mounting bracket attached to a wireless AP.

FIG. 3 is a perspective view of a mounting bracket 120 attached to a wireless AP 122. In the example of FIG. 3, the mounting bracket includes four keyholes 124 and the wireless AP includes four mounting pegs 126 that are aligned with the positions of the four keyholes of the mounting bracket. In an example, the keyholes have two rounded sections, a first section that is wide enough to pass a "head" portion of a mounting peg, and a second section that is not wide enough to pass the head portion of the mounting peg but that is wide enough to receive an elongated portion of the mounting peg and to hold the elongated portion of the mounting peg snuggly. In an example, the mounting peg is threaded at an end of the elongated portion that is opposite the head portion and the threaded end is screwed into the wireless AP, e.g., into threaded receiving holes in a body of the wireless AP.

With reference to FIG. 3, features of the mounting bracket include a bracket body 130 having multiple keyholes 124, a cable holding channel 128, and at least one flange hook 132 configured to receive a first edge of a flange of a T-bar. In the example of FIG. 3, the bracket body includes two flange hooks configured to receive a first edge of a flange of a T-bar, although the number of flange hooks can vary. Additionally, the size and/or spacing of the flange hooks can vary depending on design needs. In the example of FIG. 3, the flange hooks are spaced apart from each other and near opposite edges of the bracket body. The mounting bracket also includes a toolless locking mechanism 136 that includes a slidable piece 138 having a flange hook 140 configured to receive a second edge of the flange of a T-bar, and a locking mechanism 142 (partially visible) that is configured to allow the slidable piece to move parallel to the bracket body when a force is applied to the locking mechanism. In the example of FIG. 3, the force is applied by an installer to the locking mechanism in a direction that is perpendicular to the bracket body. FIG. 3 is shown to provide an example of what the mounting bracket and the wireless AP look like when they are attached to each other.

An example of a technique for installing a wireless AP to a T-bar of a drop ceiling using a mounting bracket as disclosed herein is described with reference to FIGS. 4A-12.

Figure 4A:
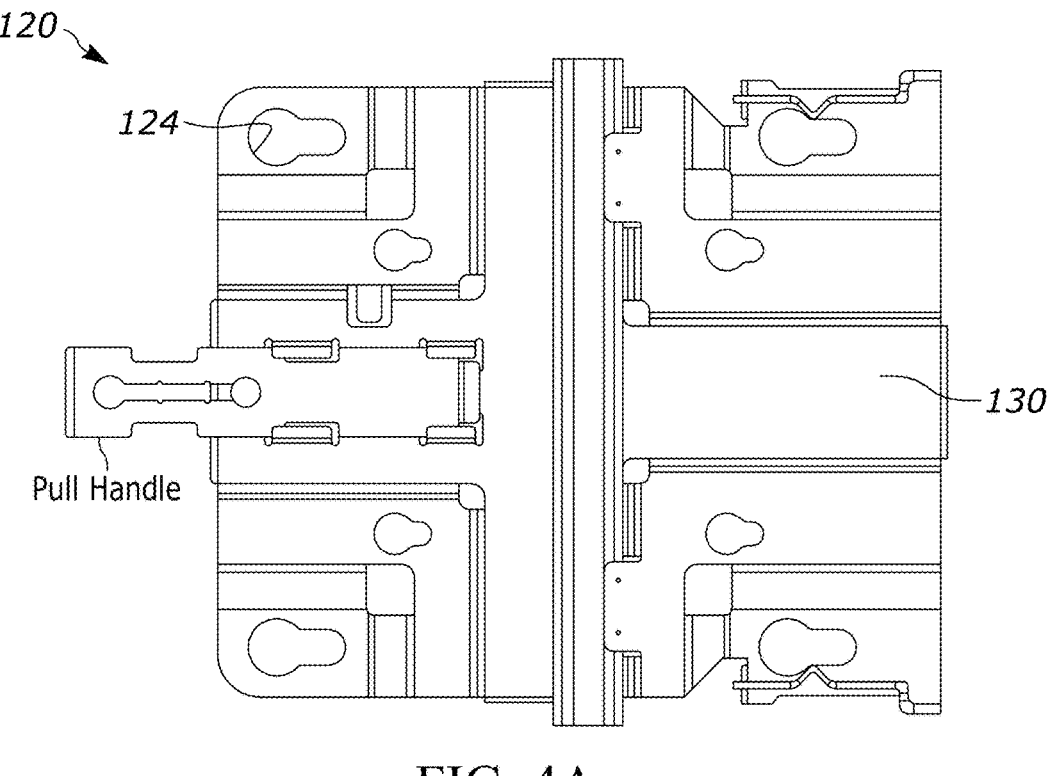
FIG. 4A is a top view of the mounting bracket.
Figure 4B:
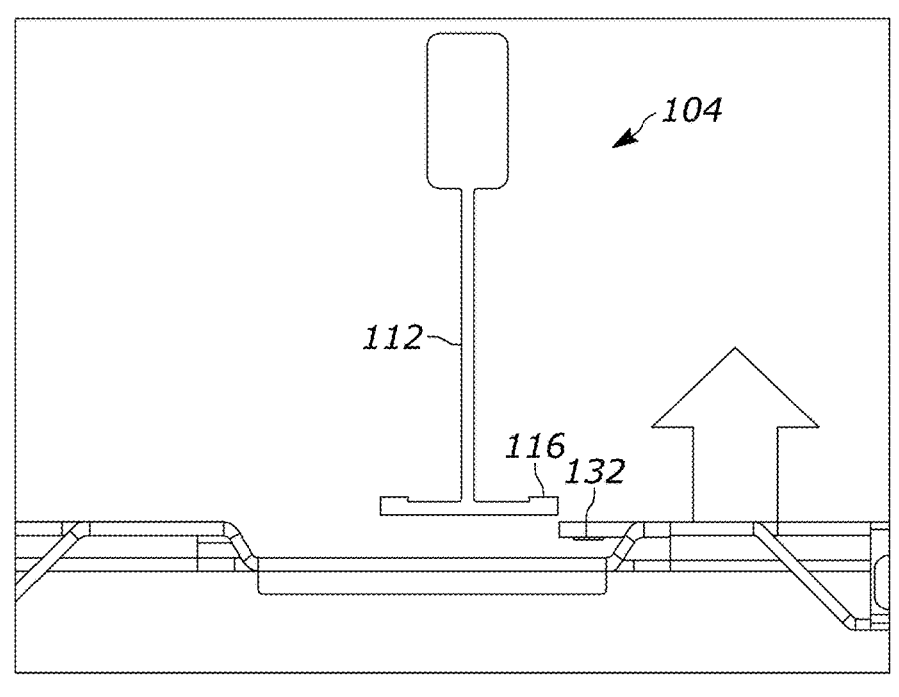
FIG. 4B is a side view of the mounting bracket relative to cross-section view of a T-bar that illustrates the mounting bracket being brought into proximity to the T-bar.

FIG. 4A is a top view of the mounting bracket 120 that shows the keyholes 124 in the bracket body 130, the flange hooks 132 that are part of the bracket body, and the slidable piece 138 of the toolless locking mechanism, including the flange hook 140 of the slidable piece. In the example of FIG. 4A, the slidable piece is in an "open" position. FIG. 4B is a side view of the mounting bracket relative to cross-section view of a T-bar that illustrates the mounting bracket being brought into proximity to the T-bar. In particular, the arrow XXX indicates that the mounting bracket is being moved (e.g., vertically relative to the ceiling tiles and/or the bottom surface of the flange of the T-bar) into close proximity to the T-bar. It also should be noted, that at this time, a wireless AP is not attached to the mounting bracket.

Figure 5A:
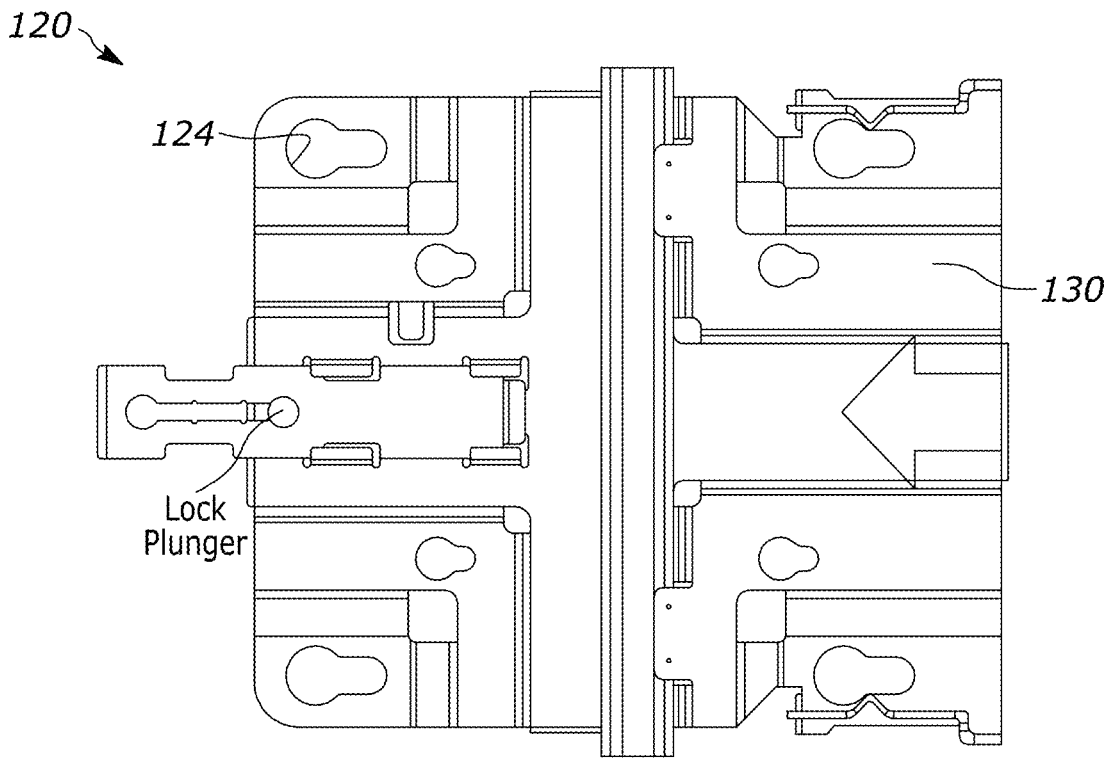
FIG. 5A is a top view of the mounting bracket.
Figure 5B:
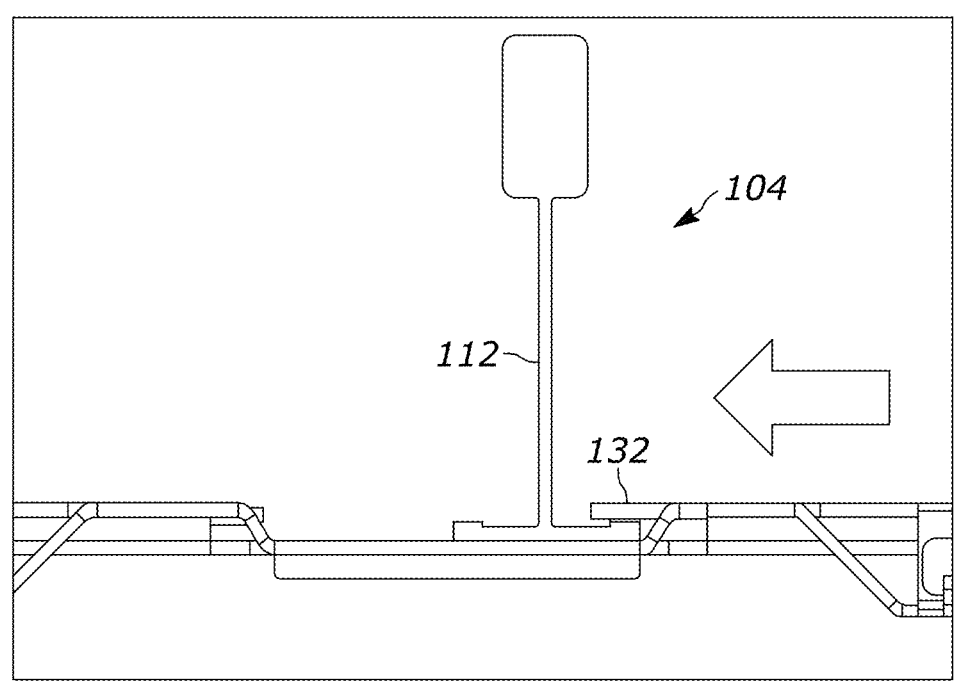
FIG. 5B is a side view of the mounting bracket relative to cross-section view of the T-bar that also illustrates the mounting bracket being moved horizontally to cause the flange hooks of the bracket body to engage with the first edge of the flange.

FIG. 5A is a top view of the mounting bracket 120 that illustrates the mounting bracket being moved horizontally (relative to the ceiling tiles) to move the first edge 116 of the flange 104 into contact with the flange hooks 132 of the bracket body 130. FIG. 5B is a side view of the mounting bracket relative to cross-section view of the T-bar 104 that also illustrates the mounting bracket being moved horizontally to cause the flange hooks of the bracket body to engage with the first edge of the flange. For example, the mounting bracket is moved horizontally relative to the ceiling tiles (not shown) until the first edge of the flange contacts an inner surface of the flange hooks. Such movements of the mounting bracket can easily be made by an installer while standing on a ladder and handling the mounting bracket with his/her hands.

Figure 6A:
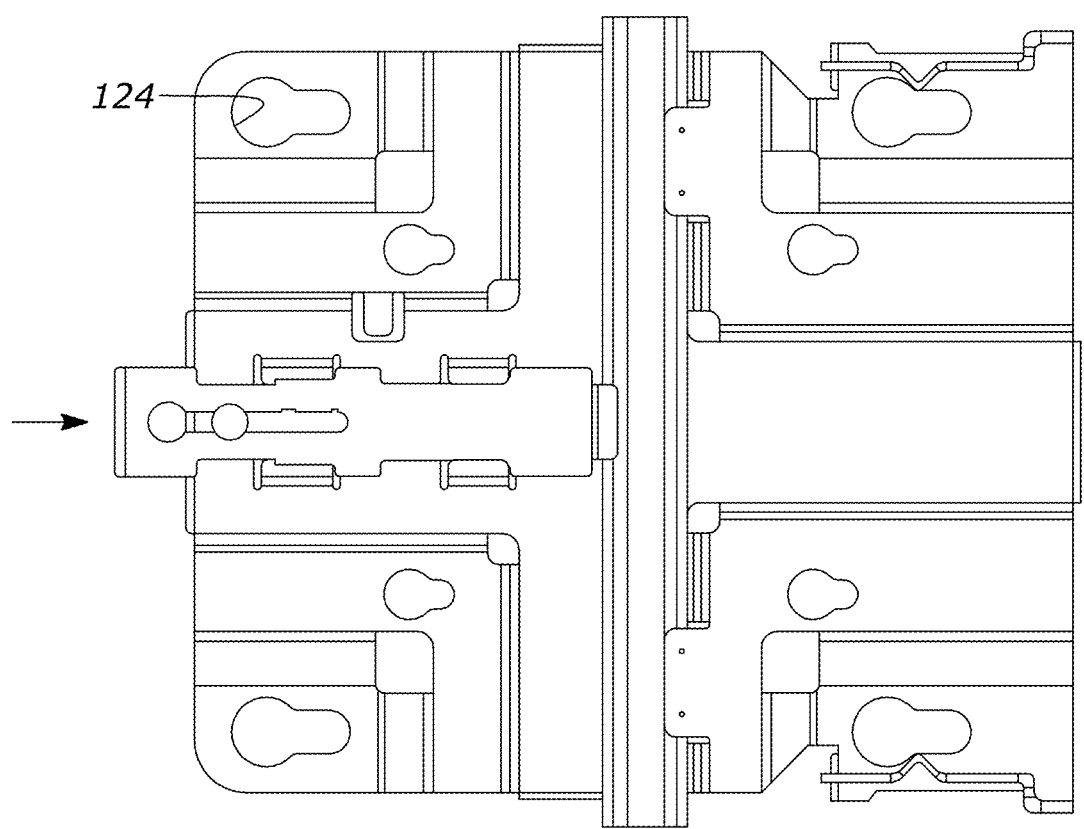
FIG. 6A is a top view of the mounting bracket.
Figure 6B:
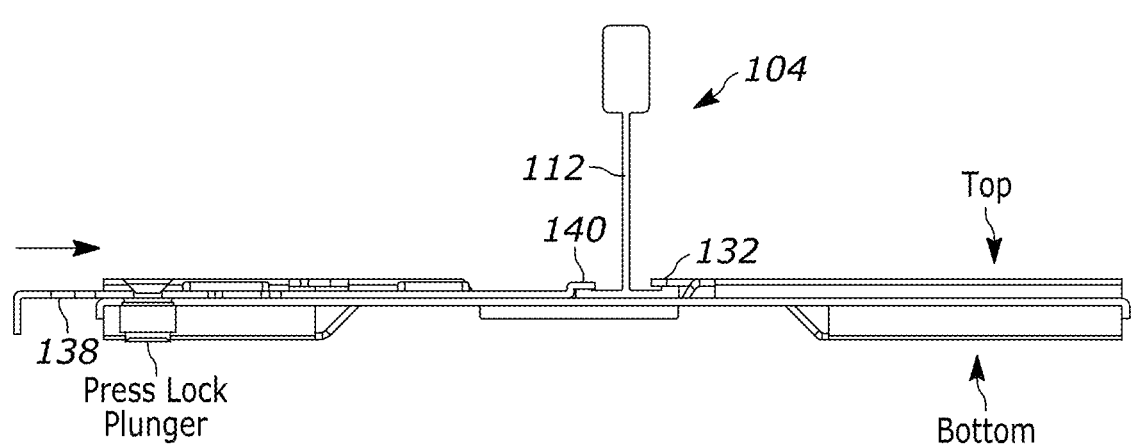
FIG. 6B is a side view of the mounting bracket relative to cross-section view of the T-bar that also illustrates the mounting bracket having been moved horizontally to cause the flange hook of the slidable piece to engage with the second edge of the flange.

FIG. 6A is a top view of the mounting bracket 120 that illustrates the slidable piece 138 of the toolless locking mechanism 136 having been moved into a position such that the flange hook 140 of the slidable piece is engaged with the second edge 118 of the flange. FIG. 6B is a side view of the mounting bracket relative to cross-section view of the T-bar 104 that also illustrates the mounting bracket having been moved horizontally to cause the flange hook of the slidable piece to engage with the second edge of the flange. For example, the slidable piece is moved horizontally relative to the bracket body and ceiling tiles until the hook of the slidable piece contacts the second edge of the flange. Such a movement of the slidable piece can easily be made by the installer while standing on a ladder and handling the mounting bracket with his/her hands.

In an example, moving the slidable piece 138 of the toolless locking mechanism 136 involves the installer applying a force to a lock plunger of the toolless locking mechanism and moving the slidable piece while the force is applied to the lock plunger. Once the slidable piece is engage with the second edge 118 of the flange, the force can be removed from the lock plunger, which causes the lock plunger to move back to its original position, which locks the slidable piece in place. In an example, the force is applied by a finger of the installer pressing on a button of the lock plunger. Typically, the installer will be standing on a ladder and reaching up to press the button of the lock plunger from below the mounting bracket.

Figure 7:
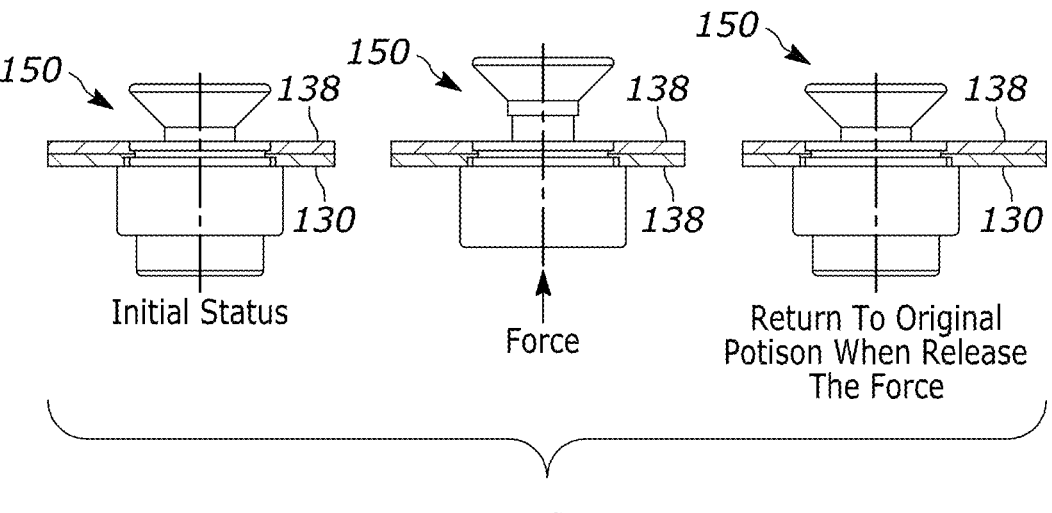
FIG. 7 illustrates states of a lock plunger that include a rest state, an activated state, and a rest state.

FIG. 7 illustrates states of a lock plunger 150 relative to the bracket body 130 and the slidable piece 138 that include a rest state (left), an activated state (middle), and a rest state (right). The three states correspond to the operations described with reference to FIGS. 4A-6B. For example, the rest state on the left side corresponds to the state of the lock plunger in FIGS. 4A and 4B (e.g., where the slidable piece is held against the bracket body), the activated state in the middle corresponds to the state of the lock plunger as the slidable piece is being moved from the position shown in FIGS. 5A and 5B to the position shown in FIGS. 6A and 6B (e.g., where the slidable piece has space to move relative to the bracket body), and the rest state on the right side corresponds to the state of the lock plunger in FIGS. 6A and 6B after the force has been removed from the lock plunger (e.g., where the slidable piece is held against the bracket body).

Figure 8:
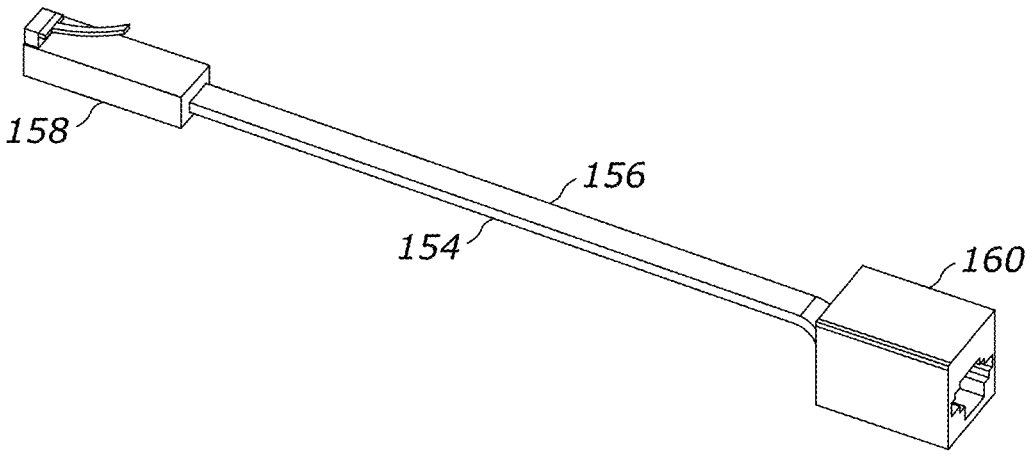
FIG. 8 is an example of a cable assembly that is used to couple the wireless AP to a compatible network cable that is available in a drop ceiling.

FIG. 8 is an example of a cable assembly 154 that is used to couple the wireless AP to a compatible network cable that is available in the drop ceiling. For example, once connected, the network cable will provide network connectivity and power to the wireless AP. In the example of FIG. 8, the cable assembly includes a piece of cable 156 (e.g., CAT6/CAT6a), a male connector 158 (e.g., RJ45 male) at one end of the cable, and a female connector 160 (e.g., RJ45 female) at the other end of the cable. In an example, the cable is a flat cable with dimensions of approximately 6 mm wide× 1.55 mm thick, and approximately 20 cm long, although these are only examples.

Once the mounting bracket 120 has been attached to a T-bar as described above, a wireless AP can be attached to the mounting bracket. An example technique for attaching a wireless AP to the mounting bracket is described below.

Figure 9:
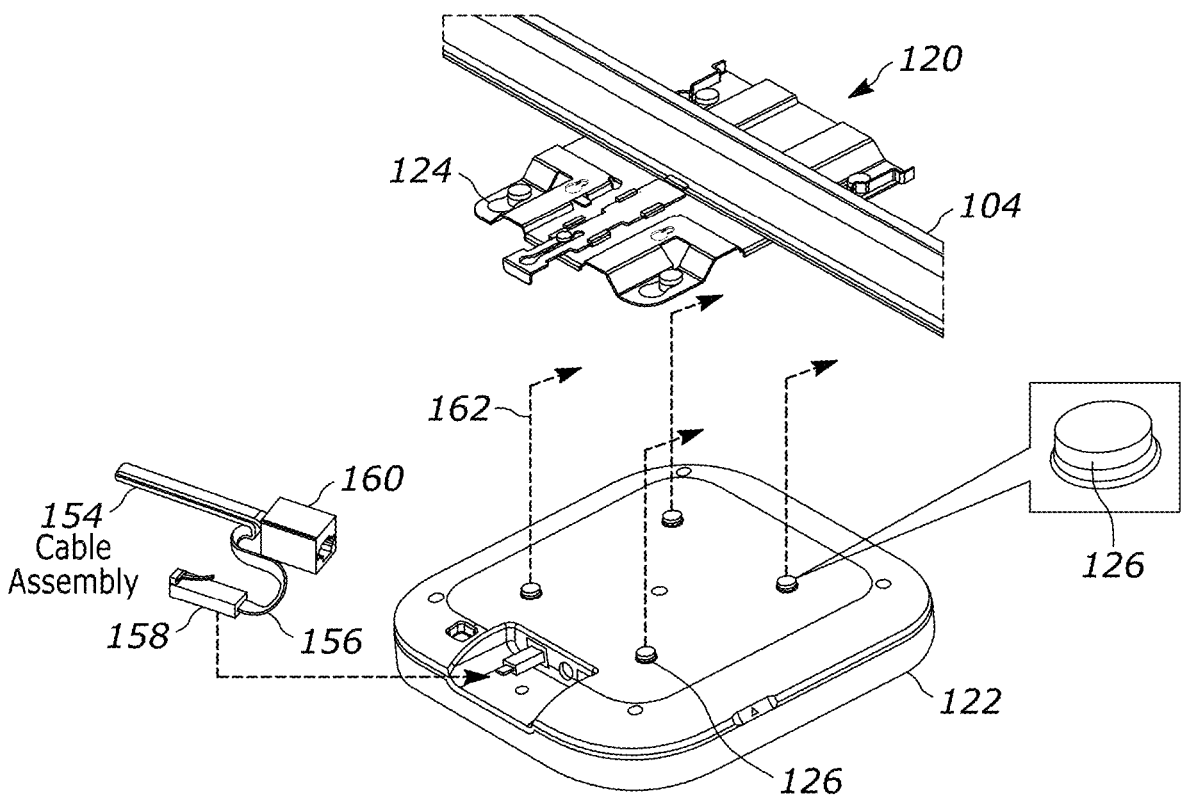
FIG. 9 illustrates a process for attaching a wireless AP to a mounting bracket after the mounting bracket has been attached to a T-bar.

FIG. 9 illustrates a process for attaching a wireless AP 122 to a mounting bracket 120 after the mounting bracket has been attached to a T-bar 104. As illustrated by the dashed line arrows 162, the wireless AP is moved up towards the mounting bracket so that the four mounting pegs 126 of the wireless AP pass through the corresponding keyholes 124. In particular, the wireless AP is moved up until the mounting pegs pass through the widest sections of the keyholes. Once the wide portion of each mounting peg is entirely through the respective keyholes, the wireless AP is moved horizontally relative to the mounting bracket (e.g., as indicated by arrows 162) to force the mounting pegs into the narrow section of each keyhole. As stated above, the narrow section of each keyhole is sized to fit snuggly around the elongated portion of the mounting pegs, thereby securely attaching the wireless AP to the mounting bracket without the need for any tool.

Figure 10:
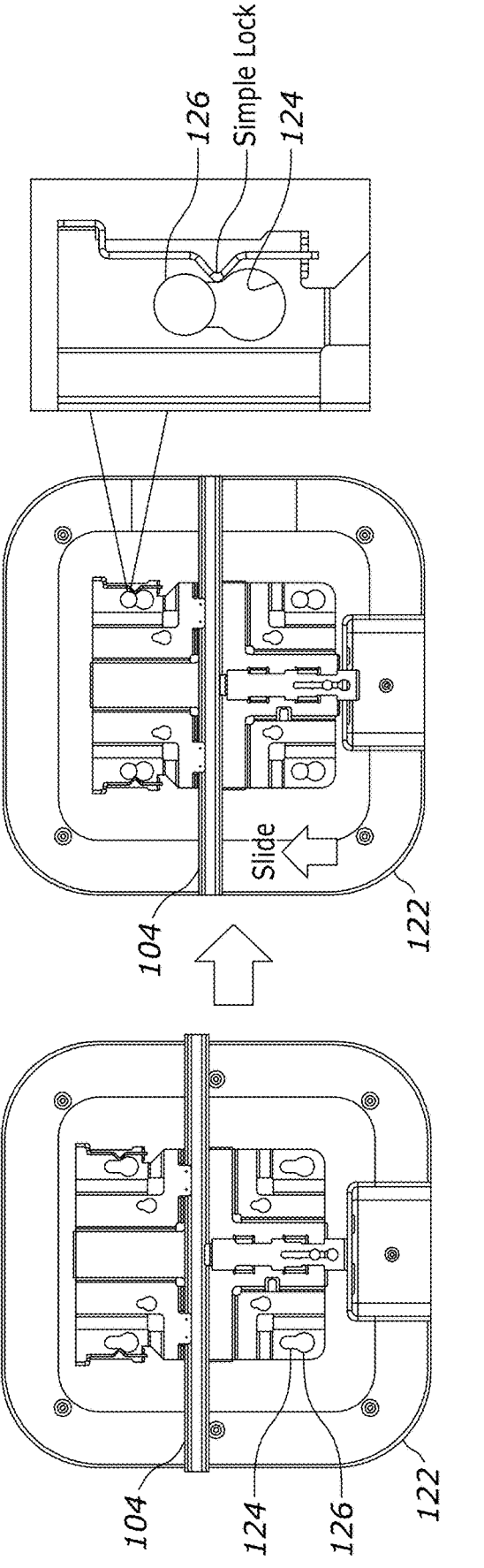
FIG. 10 illustrates a top view of the mounting process described with reference to FIG. 9.

FIG. 10 illustrates a top view of the mounting process described with reference to FIG. 9. With reference to FIG. 10, the left side of the figure shows the mounting pegs 126 of the wireless AP 122 inside the wide section of the corresponding keyholes 124. For example, the state illustrated on the left side occurs once the wireless AP has been moved up (e.g., vertically) into position. The right side of FIG. 10 shows the position of the mounting pegs in the narrow section of the mounting pegs after the wireless AP has been moved horizontally relative to the mounting bracket. Once all of the mounting pegs are forced into the narrow section of the respective keyholes, the wireless AP is "locked" into position, and considered to be attached to the mounting bracket. The right side of FIG. 10 also includes an expanded view of one mounting peg of the wireless AP relative to one keyhole of the bracket body after the wireless AP has been moved into the locked position, e.g., into the narrow section of the keyhole.

The cable assembly 154 described with reference to FIG. 8 may be attached to the wireless AP before the wireless AP is attached to the mounting bracket of after the wireless AP is attached to the mounting bracket. In an example, connecting the cable assembly to the wireless AP involves connecting the male connector of the cable assembly to a female connector of the wireless AP and then fixing the cable of the cable assembly within a cable holding channel in the mounting bracket.

Figure 11A:
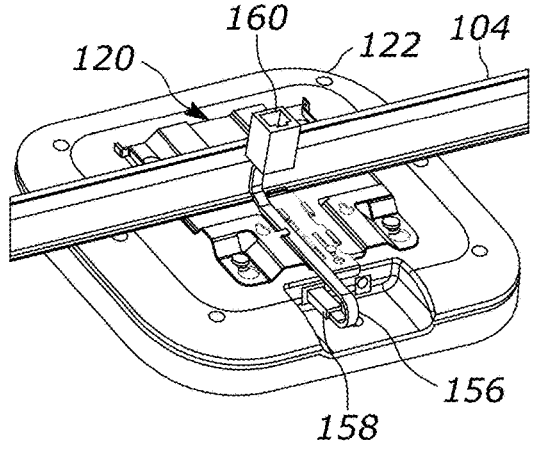
FIG. 11A is a perspective view of the wireless AP attached to the mounting bracket, the mounting bracket attached to a T-bar, and the cable assembly attached to the wireless AP and to the mounting bracket.

FIG. 11A is a perspective view of the wireless AP 122 attached to the mounting bracket 120, the mounting bracket attached to the T-bar 104, and the cable assembly 154 attached to the wireless AP and to the mounting bracket. As shown in FIG. 11A, the male connector 158 of the cable assembly is connected to a female connector of the wireless AP and the cable 156 of the cable assembly is fixed within a cable holding channel of the mounting bracket. In an example, the mounting bracket includes the cable holding channel 128 that runs along a top surface of the bracket body 130 and includes cable holding features (e.g., tabs) to secure the cable (e.g., flat cable) in the cable holding channel. Other types of cable holding features that can hold the cable in the cable holding channel are possible.

Figure 11B:
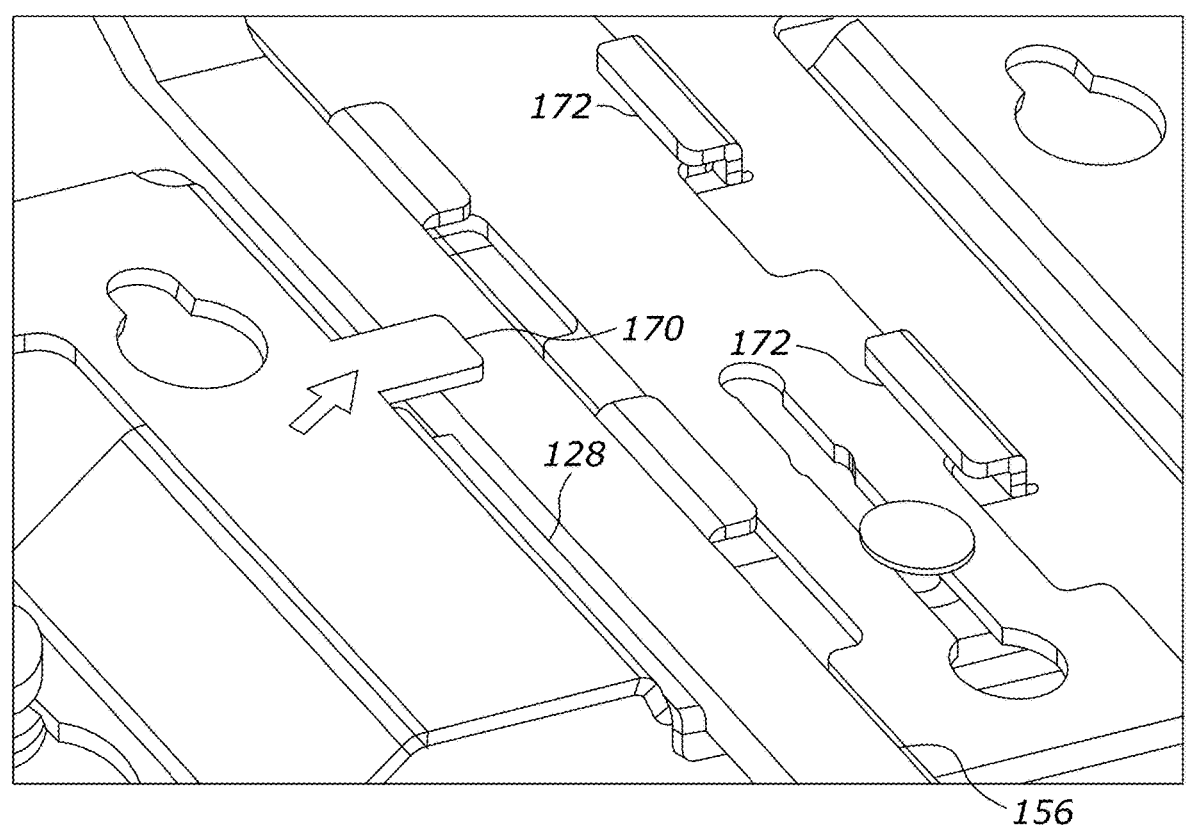
FIG. 11B is an expanded view of a portion of FIG. 11A that includes the cable holding channel and the cable held within the cable holding channel.

FIG. 11B is an expanded view of a portion of FIG. 11A that includes the cable holding channel 128 and the cable 156 held within the cable holding channel. In the example shown in FIG. 11B, the cable holding features 170 and 172 include tabs that hold the cable within the cable holding channel. In the example of FIG. 11B, the right side of the cable holding channel includes two small tabs 172 and the left side of the channel includes one larger tab 170. With this configuration, the cable (e.g., a flat cable) is inserted from right to left such that the cable is first fit under the larger tab on the left side and then forced past the smaller tabs on the left side with an amount of force that can be applied by fingers of an installer. Additionally, as shown in FIG. 11A, the cable assembly rests against the web of the T-bar and the female connector 160 of the cable assembly is easily accessible for connection to a male connector of a network cable that is in the ceiling of the building. With the cable set into the cable holding channel, a ceiling tile (once replaced into position) will not be obstructed by the cable from sitting on the flanges of the T-bars. That is, the cable holding channel enables the mounting bracket and wireless AP to be very close to the ceiling tiles, e.g., "flush" with the ceiling tiles.

Figure 12:
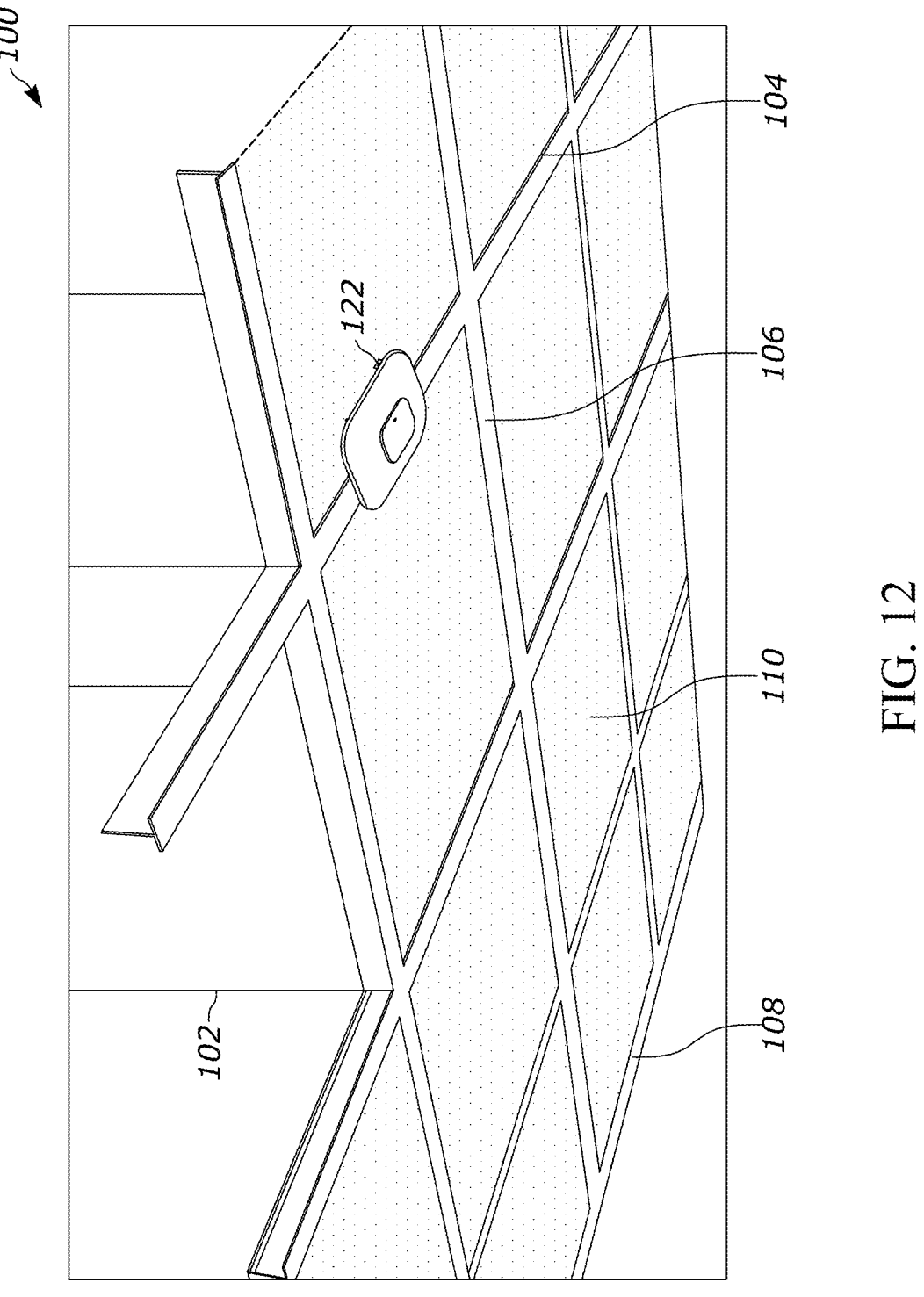
FIG. 12 is a perspective view of the drop ceiling from FIG. 1 with a wireless AP installed as described herein.

FIG. 12 is a perspective view of the drop ceiling 100 from FIG. 1 with a wireless AP 122 installed as described herein. As illustrated in FIG. 12, the wireless AP is flush with the ceiling tiles and with the T-bar to which it is attached. Using the mounting bracket and techniques as described herein, the wireless AP can be installed easily, quickly, and with no tools needed.

Figure 13:
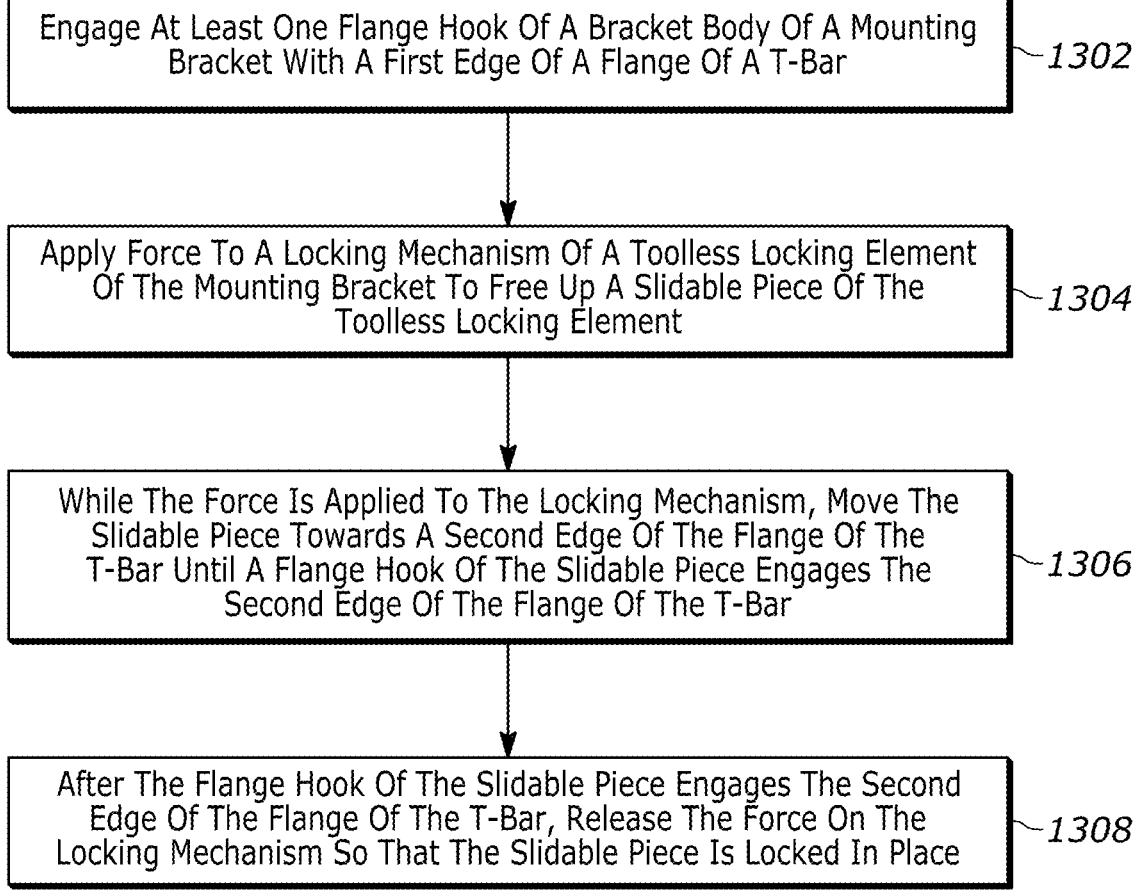
FIG. 13 is a process flow diagram of a method for installing a mounting bracket to a T-bar of a suspended ceiling.

FIG. 13 is a process flow diagram of a method for installing a mounting bracket to a T-bar of a suspended ceiling. At block 1302, at least one flange hook of a bracket body of the mounting bracket is engaged with a first edge of a flange of the T-bar. At block 1304, force is applied to a locking mechanism of a toolless locking element of the mounting bracket to free up a slidable piece of the toolless locking element. At block 1306, while the force is applied to the locking mechanism, the slidable piece is moved towards a second edge of the flange of the T-bar until a flange hook of the slidable piece engages the second edge of the flange of the T-bar. At block 1308, after the flange hook of the slidable piece engages the second edge of the flange of the T-bar, the force on the locking mechanism is released so that the slidable piece is locked in place.

FIG. 14 is a process flow diagram of a method for installing a wireless AP to a T-bar of a suspended ceiling. At block 1402, at least one flange hook of a bracket body of a mounting bracket is engaged with a first edge of a flange of the T-bar. At block 1404, force is applied to a locking mechanism of a toolless locking element of the mounting bracket to free up a slidable piece of the toolless locking element. At block 1406, while the force is applied to the locking mechanism, the slidable piece is moved towards a second edge of the flange of the T-bar until a flange hook of the slidable piece engages the second edge of the flange of the T-bar. At block 1408, after the flange hook of the slidable piece engages the second edge of the flange of the T-bar, the force on the locking mechanism is released so that the slidable piece is locked in place. At block 1410, the wireless AP is attached to the mounting bracket after the mounting bracket is attached to the T-bar.

In the example described herein, the keyholes in the bracket body of the mounting bracket have a keyhole shape with two intersecting circular shaped sections. For example, the shape and dimensions of the keyholes are selected to match with the shape and dimensions of the mounting pegs of the wireless AP. Other shapes and dimensions of the keyholes and mounting pegs are possible. Additionally, other structural and/or mechanical features of the mounting bracket and the wireless AP may be utilized to enable toolless attachment of the wireless AP to the mounting bracket.

In the example described herein, the lock plunger may utilize a spring loaded pin to provide a locking tension. Other means of providing the locking tension are possible.

In some conventional approaches to mounting a wireless AP to a T-bar of a drop ceiling involves cutting a hole or channel in a ceiling tile and passing a cable from the building through the hole/channel to connect up to the wireless AP. The cable holding channel of the mounting bracket as disclosed herein avoids the need for a hole in a ceiling tile and provides an easy way for the wireless AP to be connected to a network cable of the building without the need for any tools.

As described herein, there is no special tool required to attach the wireless AP to the T-bar, and also no need to cut/drill a ceiling tile to connect a network cable. The network cable will sneak through the tile edge, and the AP can be mounted with a push button/plunger. The installer need not to be technician and the installers need not have prior experience.

In an example, an installed wireless AP can be removed, or uninstalled, without the need for any tools. Removing the wireless AP may involve moving a ceiling tile, disconnecting a network cable from the building from the cable assembly, disconnecting the cable assembly from the mounting bracket and from the wireless AP, and then moving the wireless AP horizontally relative to the mounting bracket to release the four mounting pegs from the narrow portion of the keyholes in the bracket body, then lowering the wireless AP so that the mounting pegs pass out of the keyholes such that the wireless AP is now disconnected from the mounting bracket. Next, the mounting bracket is removed from the T-bar by applying a force to the lock plunger (e.g., with a finger or fingers of the installer) to release the locking mechanism, and sliding the slidable piece vertically relative to the bracket body, while the force is applied to the lock plunger, far enough that the flange hook of the slidable piece disengages with the edge of the flange. Next, the mounting bracket is moved horizontally relative to the ceiling tiles to remove the other edge of the flange from the flange hooks on the bracket body. The mounting bracket can then be lowered down by the installer, at which point the wireless AP and mounting bracket are removed/uninstalled without the need of any tools.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for installing a mounting bracket to a T-bar of a suspended ceiling, the method comprising:

engaging at least one flange hook of a bracket body of a mounting bracket with a first edge of a flange of a T-bar;

applying force to a locking mechanism of a toolless locking element of the mounting bracket to free up a slidable piece of the toolless locking element;

while the force is applied to the locking mechanism, moving the slidable piece towards a second edge of the flange of the T-bar until a flange hook of the slidable piece engages the second edge of the flange of the T-bar; and after the flange hook of the slidable piece engages the second edge of the flange of the T-bar, releasing the force on the locking mechanism so that the slidable piece is locked in place.

2. The method of claim 1, wherein the force is applied perpendicular to a plane of the bracket body.

3. The method of claim 1, wherein the toolless locking element includes a lock plunger that is configured to disengage with the slidable piece in response to an applied force.

4. The method of claim 1, wherein the lock plunger is accessible from a bottom side of the bracket body.

5. The method of claim 1, wherein the slidable piece has a tab at an end of the slidable piece that is opposite the flange hook of the slidable piece.

6. The method of claim 1, wherein the bracket body includes at least two flange hooks configured to receive the first edge of the flange of the T-bar.

7. The method of claim 6, wherein the flange hook of the slidable piece is between the at least two flange hooks of the bracket body.

8. A method for installing a wireless access point (AP) to a T-bar of a suspended ceiling, the method comprising:

engaging at least one flange hook of a bracket body of the mounting bracket with a first edge of a flange of a T-bar;

applying force to a locking mechanism of a toolless locking element of the mounting bracket to free up a slidable piece of the toolless locking element;

while the force is applied to the locking mechanism, moving the slidable piece towards a second edge of the flange of the T-bar until a flange hook of the slidable piece engages the second edge of the flange of the T-bar;

after the flange hook of the slidable piece engages the second edge of the flange of the T-bar, releasing the force on the locking mechanism so that the slidable piece is locked in place; and attaching a wireless access point (AP) to the mounting bracket after the mounting bracket is attached to the T-bar.

9. The method of claim 8, wherein attaching the wireless AP to the mounting bracket involves aligning mounting pegs of the wireless AP with keyholes of the bracket body, passing the mounting pegs through the keyholes, and then moving the wireless AP horizontally relative to the bracket body to lock the mounting pegs in narrow portions of the keyholes.

10. The method of claim 8, wherein attaching the wireless AP to the mounting bracket involves aligning four mounting pegs of the wireless AP with four keyholes of the bracket body, passing the four mounting pegs through the four keyholes, and then moving the wireless AP horizontally relative to the bracket body to lock the four mounting pegs in narrow portions of the four keyholes.

11. The method of claim 8, wherein the four keyholes are distributed at four corners of the bracket body.

12. The method of claim 8, wherein the keyholes of the bracket body includes two circular shaped features.

13. The method of claim 8, further comprising attaching a male connector of a cable assembly to a female connector of the wireless AP, seating a portion of the cable assembly into a cable holding channel of the bracket body, and connecting a male connector of a cable to a female connector of the cable assembly.

* * * * *